United States Patent [19]

Bartissol et al.

[11] 4,404,073
[45] Sep. 13, 1983

[54] PHOTOPOLYMERIZATION OF OLEFINICALLY UNSATURATED MONOMERS UTILIZING BENZIL DIMETHYLACETAL

[75] Inventors: Alain Bartissol, Clamecy; Jean Boutin, Mions; François Wachowski, Clamecy, all of France

[73] Assignee: Rhone-Poulenc Industries, Paris, France

[21] Appl. No.: 299,223

[22] Filed: Sep. 3, 1981

[30] Foreign Application Priority Data

Sep. 4, 1980 [FR] France ............................. 80 19100

[51] Int. Cl.³ .......................... C08F 2/10; C08F 2/50; C08F 2/46
[52] U.S. Cl. .......................... 204/159.23; 204/159.22; 210/733; 427/54.1
[58] Field of Search .................. 204/159.23; 427/54.1

[56] References Cited

U.S. PATENT DOCUMENTS

| | | | |
|---|---|---|---|
| 4,131,529 | 12/1978 | Osterioh et al. | 204/159.14 |
| 4,178,221 | 12/1979 | Boutin et al. | 204/159.23 |
| 4,190,602 | 2/1980 | Brunisholz et al. | 204/159.23 |
| 4,252,625 | 2/1981 | Boutin et al. | 204/159.22 |
| 4,308,148 | 12/1981 | Boutin et al. | 210/705 |

FOREIGN PATENT DOCUMENTS

| | | |
|---|---|---|
| 2084010 | 12/1971 | France. |
| 2194698 | 3/1974 | France. |
| 2453185 | 10/1980 | France. |
| 1310729 | 3/1973 | United Kingdom. |
| 1435224 | 4/1976 | United Kingdom. |

Primary Examiner—Wilbert J. Briggs, Sr.
Attorney, Agent, or Firm—Burns, Doane, Swecker & Mathis

[57] ABSTRACT

High molecular weight water-soluble polymers essentially devoid of residual monomer content and well adapted for use as flocculating agents, are prepared by photopolymerizing a thin layer of a deoxygenated aqueous solution of an olefinically unsaturated monomer continuously deposited upon a travelling support substrate, said aqueous solution containing a photopolymerization photoinitiator and said photoinitiator comprising benzil dimethylacetal.

14 Claims, No Drawings

PHOTOPOLYMERIZATION OF OLEFINICALLY UNSATURATED MONOMERS UTILIZING BENZIL DIMETHYLACETAL

BACKGROUND OF THE INVENTION

1. Field of the Invention:

The present invention relates to the preparation of water-soluble, high molecular weight organic polymers/copolymers especially adapted as polymeric flocculants for the treatment of waste and other impure waters, and, more especially, to the preparation of high molecular weight, water-soluble acrylic polymers or copolymers essentially devoid of residual monomer or monomers, and to the products of such preparation.

2. Description of the Prior Art:

It is well known to this art that, for reasons of toxicity, it is exceedingly important to utilize for water treatment, e.g., water purification, organic water-soluble polymers or copolymers containing but very slight amounts of residual monomer or monomers. Indeed, different government regulations have set an acceptable upper limit on the content of residual monomer or monomers (particularly in the case of acrylamide polymers or copolymers) at 0.05% by weight, with respect to the weight of the dry polymer.

The preparation of acrylic polymers or copolymers by photopolymerization under ultraviolet irradiation too is well known to the prior art. Compare U.S. Pat. No. 4,178,221 which features the preparation of water-soluble acrylic polymers of high molecular weight containing little or no free monomer. According to this particular process, an aqueous solution of acrylic monomer or monomers is continuously deposited onto a support in the form of a thin layer, said solution containing a photopolymerization promoter in an amount of 0.005 to 1% by weight with respect to the total weight of the monomer or monomers, and also containing less than 1 mg oxygen per liter of solution; the thin liquid layer is then subjected to irradiation at wavelengths between 300 nm and 450 nm for 1 to 20 minutes, the average power of such radiation being between 20 and 300 watts/m$^2$, the gaseous atmosphere enveloping the thin liquid layer having an oxygen content of less than 5% by volume and the support being cooled in order to facilitate heat removal. Next, the thin layer thus subjected to the onset of photopolymerization is maintained on the cooled support and under an atmosphere free of oxygen and is then exposed to a second radiation stage, at wavelengths between 300 and 450 nm for 1 to 20 minutes, the average power of such radiation being between 300 and 2000 watts/m$^2$; thence in order to effect removal of the residual monomers present in the resulting, at least partially solidified thin layer, the same is stripped from the support and subjected to yet another stage of irradiation, preferably in a cool air atmosphere, said irradiation being at wavelengths of between 300 and 450 nm for 30 minutes to 3 hours, and with the average power of active radiation being between 20 and 500 watts/m$^2$. The resultant film is subsequently cut into fragments, dried and ground into powder. This process yields polymer having a content of residual monomer or monomers of less than 0.05%. However, it displays the disadvantage of requiring a lengthy period of third-stage irradiation (30 minutes to 3 hours) under conditions differing from those of the earlier irradiation stages. Thus, such prior art process is both time-consuming, as well as expensive.

It too has been postulated that the aforesaid lengthy period of irradiation of from 30 minutes to 3 hours could be avoided by simply extracting the residual monomer(s) with any suitable solvent, such as dilute methanol. And indeed the ultimate product of photopolymerization may be treated with methanol to dissolve the residual monomers, but this is a lengthy, costly and difficult operation, especially in light of the hazardous and toxic character of methanol.

Also, in published French Application No. 2,453,185 there is described a process for the preparation of acrylic polymers or copolymers having high molecular weights and a very low content of residual monomer or monomers, this being a process of the type according to which a liquid layer of an aqueous solution of an acrylic monomer, or of acrylic monomers, which has a pH of between about 4 and about 14 and which contains a photopolymerization promoter is deposited on a support and the liquid layer is subjected to the action of radiation of wavelengths between about 300 nanometers and about 450 nanometers until a rubbery layer is obtained, the process being characterized in that at least one of the two face surfaces of the rubbery layer obtained is coated with at least one alkali metal sulfite and/or at least one alkali meta metabisulfite, and thence the coated rubbery layer is chopped into flakes, and the flakes are dried and ground.

The powder obtained according to this latter process has a monomer content of less than 0.05%. However, it will be appreciated that a new stage, involving a particular treatment, has had to be introduced into the process.

And in French Pat. No. 2,084,010 a process is described for the preparation of water-soluble acrylic polymers, which process features the intermittent irradiation of a thin layer of acrylic monomers containing various types of photoinitiators. Nonetheless, the patent examples reflect a residual monomer(s) content on the order of 2%.

French Pat. No. 2,194,698 envisages the use of benzil dimethylacetal in the photopolymerization of divers monomers. However, this '698 patent neither suggests nor alludes to the use of benzil dimethylacetal for the polymerization of thin layers of aqueous solutions of unsaturated monomers.

SUMMARY OF THE INVENTION

Accordingly, a major object of the present invention is the provision of an improved process for the photopolymerization of acrylic monomer(s), and for the preparation of water-soluble acrylic polymers essentially devoid of residual monomer content, which process is characterized in that the photoinitiator means comprises benzil dimethylacetal.

Indeed, it has now surprisingly been found that in the subject process not only is a reduction in the residual monomer content achieved, but also that the rate of dissolution of the product polymer is increased, which is a marked advantage upon actual utilization of the polymer.

DETAILED DESCRIPTION OF THE INVENTION

More particularly according to this invention, an improved process is provided for the preparation of water-soluble polymers which have a high molecular weight and a low content of residual monomer or monomers, and which can, in particular, be used as flocculating agents, by irradiating, with radiation having wavelengths ranging from 150 to 500 nm (preferably ranging from 300 to 450 nm), a thin layer, deposited continuously on a moving support, of a deoxygenated aqueous solution of olefinically unsaturated monomers containing a polymerization photoinitiator, and characterized in that the photoinitiator comprises benzil dimethylketal.

According to the present invention, the content of benzil dimethylketal preferably ranges from 0.001% to 0.5% relative to the weight of monomer, and advantageously ranges from 0.003 to 0.3%.

The process according to the invention is particularly suitable for the photopolymerization of an aqueous solution of monomer or monomers deposited as a layer having an approximate thickness of from 2 to 20 mm, and containing 0.001 to 0.5% by weight, relative to the weight of the monomer or monomers, of a photopolymerization promoter and less than 1 mg of oxygen per liter of solution. This layer is then subjected, for 5 to 20 minutes, to the action of radiation of a wavelength ranging from 300 to 450 nm, which has a mean intensity of between 20 and 2,000 watts/m$^2$ and the same being applied in an increasing manner, with the gaseous atmosphere enveloping the liquid layer being moist and having an oxygen content of less than 5% by volume and with the support being cooled to remove the heat generated by the polymerization.

The monomers are selected from the group comprising acrylamide, methacrylamide, acrylonitrile, methacrylonitrile, acrylic acid, methacrylic acid, methallylsulfonic acid, vinylbenzenesulfonic acid, the salts and esters of such acids, N-vinylpyrrolidone, 2-methyl-5-vinyl-pyridine, optionally quaternized aminoalkyl acrylates and methacrylates, and mixtures of same. The subject process more preferably features the photopolymerization of acrylamide because the aforenoted regulations relate particularly to the polyacrylamides.

The concentration of the aqueous starting solution can vary according to the nature of the monomers. Thus, with acrylamide or mixtures thereof with alkali metal acrylates, such concentration typically ranges from 20 to 60% by weight and preferably from 40 to 50%. If it is desired to prepare a cationic polymer (namely, a polymer whose chain possesses electropositive sites) based on aminoalkyl methacrylate chloride, the concentration can be higher, namely, from 40 to 90% by weight and preferably from 50 to 85%. If it is desired to obtain a quaternized copolymer of acrylamide and an aminoalkyl methacrylate, the concentration of these monomers preferably ranges from 40 to 85%.

Advantageously, the thin layer of aqueous monomer solution has a thickness ranging from 2 to 20 mm, preferably from 3 to 8 mm; the movable support substrate is cooled and the pH is maintained from 8 to 14 in order to obtain nonionic or anionic polymers and from 2 and 8 in order to obtain cationic polymers.

It is also possible to add to the aqueous solution subjected to photopolymerization, a photopolymerization adjuvant of the group comprising gluconic acid and its sodium, potassium and ammonium salts, saccharic acid and its sodium and potassium salts, and adipic acid.

Finally, it too has been observed that the advantages of the process of the invention are cumulative with those of the noted process employing a sulfite and/or metabisulfite. According to this embodiment of the process, at least one of the two face surfaces of the rubbery layer obtained after irradiation is coated with at least one alkali metal sulfite and/or at least one alkali metal metabisulfite, the amount of alkali metal sulfite and/or metabisulfite ranging from 0.1% to about 3%, preferably from 0.3% to about 2%, by weight relative to the weight of the rubbery layer and the rubbery layer is chopped into flakes which are then dried and ground.

If the aqueous solution of acrylic monomer or monomers has a pH less than or equal to 12, it is possible to use, simultaneously with the alkali metal sulfite and/or alkali metabisulfite, at least one carbonate selected from the group comprising the alkali metal carbonates and, in particular, ammonium carbonate.

In order to further illustrate the present invention and the advantages thereof, the following specific examples are given, it being understood that same are intended only as illustrative and in nowise limitative.

EXAMPLE 1

A solution was prepared in a dissolution tank by successively adding thereto, under stirring: 65.25 kg of demineralized water, 47.5 kg of acrylamide, 19.5 kg of a 50% strength by weight aqueous sodium hydroxide solution, 17.55 kg of acrylic acid and 0.5 kg of sodium gluconate.

This solution was fed to the top of a packed column; an aqueous 20% strength sodium hydroxide solution, by means of which the pH could be regulated to 12.1, was introduced at the top of the same column. A stream of 140 ml/h of a solution of 34 g of benzoin isopropyl ether per liter of acrylic acid was introduced into the middle of the column and a stream of nitrogen, sufficient to maintain the dissolved oxygen content of the liquid issuing at the base of the column at less than or equal to 0.15 mg of oxygen per liter of solution, was introduced at the base of the column.

The deaerated aqueous monomer solution was continuously deposited, at a rate of 31 liters/h, onto a 48 cm wide stainless steel belt having two similar lateral flanges for preventing material from being lost over the sides. Furthermore, the belt was slightly inclined in the direction of travel such as to prevent solution from flowing backwards. The gaseous atmosphere above the belt was confined by glass plates and was freed of oxygen by a stream of moist nitrogen (oxygen content less than or equal to 0.2%). The metal belt travelled at a speed of 24 cm per minute. At this speed, the thickness of the layer of monomer solution was about 4.5 mm. The belt, cooled at its underside by means of water at 15° C., was subjected, over a length of 3.6 m, to irradiation as follows: 16 low pressure mercury vapor lamps each having an electrical power of 40 watts (make: Philips TLAK 40 W/05) were arranged over a distance of 120 cm, at right angles to the direction of travel of the belt and at 10 cm from the belt; the 2nd, 4th, 6th, 8th, 11th, 13th and 15th lamp were switched off, and thereafter a second irradiation stage following the first was thus carried out. Over the remaining 240 cm, 32 low pressure mercury vapor lamps, each having an electrical power of 20 watts (make: Philips TLAK 20 W/09) were arranged; these 32 lamps were arranged like the preceding lamps, were numbered 17 through 48, and were all switched on. The duration of irradiation was 15 minutes.

The following Table reflects the conditions of operation:

TABLE I

| Distance over which irradiated | Surface temperature | Appearance of the product |
|---|---|---|
| 30 cm | 31° C. | Thread-forming product |
| 60 cm | 49° C. | Viscous product |
| 90 cm | 59° C. | Plastic product |
| 120 cm | 54° C. | Plastic product |
| 150 cm | 38° C. | Plastic product |

"Thread-forming product" connotes that the solution had assumed a sufficient viscosity to cause it to flow slowly, like an oil, without breaking up into droplets. By "viscous product" there is intended a fluid which is capable of flow, but in which air bubbles do not form if it is vigorously shaken manually. By "plastic product" there is intended a gel having a rubbery consistency.

After 15 minutes of irradiation, a plastic film was obtained, which was removed from the belt by simple pulling.

The film was then broken into fragments by means of a chopper, dried for 30 minutes at about 75° C. and thereafter ground into a powder.

This powder dissolved perfectly, without leaving insoluble matter or residue, in demineralized water at ambient temperature over the course of 3 hours, at a concentration of 5 g of polymer/liter. After dissolving an additional 5% of sodium chloride in the solution, the Brookfield viscosity at 10 rpm, with a No. 1 spindle, was 270 cps at 20° C.

The powder contained 0.91% of residual acrylamide monomer.

EXAMPLE 2

The procedure was identical to Example 1, except that the "solution of 34 g of benzoin isopropyl ether per liter of acrylic acid" was replaced by a solution of 10 g of benzil dimethylketal (Irgacure 651 from Ciba-Geigy) per liter of acrylic acid.

The following Table reflects the conditions of operation:

TABLE II

| Distance over which irradiated | Surface temperature | Appearance of the product |
|---|---|---|
| 30 cm | 34° C. | Thread-forming product |
| 60 cm | 42° C. | Viscous product |
| 90 cm | 59° C. | Plastic product |
| 120 cm | 50° C. | Plastic product |
| 150 cm | 43° C. | Plastic product |

The final powder dissolved perfectly in water, without leaving insoluble matter, over the course of 1 hour, 30 minutes at a concentration of 5 g of polymer/liter; with 5% of sodium chloride, the Brookfield viscosity was 280 cps at 20° C.

The powder contained 0.22% of residual acrylamide monomer.

EXAMPLE 3

The procedure was identical to the preceding example, except that the monomer content was reduced to a value below 0.015% by treating the rubbery layer, on both face surfaces, with 0.5 to 0.9% by weight, relative to the rubbery layer, of sodium sulfite before chopping, drying and grinding the layer. The final powder had the same characteristics as that of Example 2, except that the residual monomer content was further reduced.

EXAMPLE 4

This example was carried out identically to Example 1, except that the 0.5 kg of sodium gluconate was replaced by 0.5 kg of adipic acid.

The following Table reflects the conditions of operation:

TABLE III

| Distance over which irradiated | Surface temperature | Appearance of the product |
|---|---|---|
| 30 cm | 37° C. | Thread-forming product |
| 60 cm | 56° C. | Viscous product |
| 90 cm | 62° C. | Plastic product |
| 120 cm | 60° C. | Plastic product |
| 150 cm | 47° C. | Plastic product |
| 180 cm | 42° C. | Plastic product |

The final powder dissolved perfectly in water, without leaving insoluble matter, over the course of 1 hour, 30 minutes, at a concentration of 5 g/liter.

The Brookfield viscosity in the presence of 5% of sodium chloride has 450 cps at 20° C.

The powder contained 0.59% of residual acrylamide monomer.

EXAMPLE 5

This example was identical to Example 1, except that the 0.5 kg of sodium gluconate were replaced by 0.5 kg of adipic acid and the solution containing 34 g of benzoin isopropyl ether per liter of acrylic acid was replaced by a solution of 12 g of benzil dimethylketal per liter of acrylic acid.

The following Table reflects the conditions of operation:

TABLE IV

| Distance over which irradiated | Surface temperature | Appearance of the product |
|---|---|---|
| 30 cm | 36° C. | Thread-forming product |
| 60 cm | 48° C. | Viscous product |
| 90 cm | 62° C. | Plastic product |
| 120 cm | 64° C. | Plastic product |
| 150 cm | 52° C. | Plastic product |
| 180 cm | 40° C. | Plastic product |

The final powder dissolved perfectly in water, without leaving insoluble matter, over the course of 1 hour, at a concentration of 5 g/liter.

The Brookfield viscosity in the presence of 5% of sodium chloride was 420 cps at 20° C.

The powder contained 0.20% of residual acrylamide monomer.

The foregoing examples, accordingly, illustrate the advantages of the present invention, both from the point of view of the speed of dissolution and from the point of view of the residual monomer content; furthermore, less photoinitiator is used than in the case of benzoin isopropyl ether.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of a high molecular weight water-soluble polymer essentially devoid of residual monomer content and having an increased rate of dissolution, comprising photopolymerizing a thin layer of a deoxygenated aqueous solution of an olefinically unsaturated monomer continuously deposited upon a travelling support substrate, said aqueous solution containing a photopolymerization photoinitiator and said photoinitiator comprising benzil dimethylacetal at from 0.001% to 0.5% by weight based upon the weight of the monomer photopolymerized.

2. The process as defined by claim 1, said photopolymerization being effected via irradiation with radiation having a wavelength ranging from 150 to 500 nm.

3. The process as defined by claim 2, said radiation having a wavelength ranging from 300 to 450 nm.

4. The process as defined by claim 1, said amount of benzil dimethylacetal ranging from 0.003% to 0.3% by weight.

5. The process as defined by claim 1, wherein the aqueous monomer solution contains less than 1 mg of oxygen per liter of solution and is exposed, for 5 to 20 minutes, in a moist atmosphere having an oxygen content of less than 5% by volume, to radiation having wavelengths ranging from 300 and 450 nm, having an active radiation intensity, applied increasingly, of 20 to 2,000 watts/m$^2$.

6. The process as defined by claims 1 or 5, wherein the monomer is selected from the group comprising acrylamide, methacrylamide, acrylonitrile, methacrylonitrile, acrylic acid, methacrylic acid, methallylsulfonic acid, vinylbenzenesulfonic acid, the salts and esters of such acids, N-vinyl-pyrrolidone, 2-methyl-5-vinyl-pyridine, optionally quaternized aminoalkyl acrylates and methacrylates, and admixtures thereof.

7. The process as defined by claim 6, wherein the thin layer of aqueous monomer solution has a thickness ranging from 2 to 20 mm, the travelling support is externally cooled and the pH is either maintained from 8 to 14 in order to obtain non-ionic or anionic polymers, or from 2 to 8 in order to obtain cationic polymers.

8. The process as defined by claim 6, wherein the aqueous solution subjected to photopolymerization contains a photopolymerization adjuvant selected from the group comprising gluconic acid and its sodium, potassium and ammonium salts, saccharic acid and its sodium and potassium salts, and adipic acid.

9. The process as defined by claim 6, wherein at least one of the two face surfaces of the rubbery layer obtained after irradiation is coated with at least one alkali metal sulfite and/or at least one alkali metal metabisulfite, the amount of alkali metal sulfite and/or metabisulfite ranging from 0.1% to about 3% by weight relative to the weight of the rubbery layer, and said rubbery layer is thence chopped into flakes which are then dried and ground.

10. The process as defined by claim 9, wherein the aqueous solution of acrylic monomer has a pH less than or equal to 12, and at least one carbonate selected from the group comprising the alkali metal carbonates is coated simultaneously with the alkali metal sulfite and/or metabisulfite.

11. The process as defined by claim 10, wherein the carbonate is ammonium carbonate.

12. The process as defined by claim 7, said thin layer having a thickness ranging from 3 to 8 mm.

13. The process as defined by claim 9, the amount of alkali metal sulfite and/or bisulfite ranging from 0.3% to about 2% by weight.

14. The product of the process as defined by claim 1.

* * * * *